United States Patent
Aoki et al.

[11] Patent Number: 6,105,887
[45] Date of Patent: Aug. 22, 2000

[54] METHOD FOR HOMOGENEOUSLY MIXING URANIUM/PLUTONIUM MIXED OXIDE

[75] Inventors: Yoshikazu Aoki, Hitachi-oota; Junji Jike, Higashi-ibaraki-gun; Masashi Kayano, Hitachi-naka, all of Japan

[73] Assignee: Japan Nuclear Cycle Development Institute, Ibaraki-ken, Japan

[21] Appl. No.: 09/149,117

[22] Filed: Sep. 9, 1998

[30] Foreign Application Priority Data

Oct. 2, 1997 [JP] Japan ..................................... 9-285992

[51] Int. Cl.$^7$ .................................................. B02C 19/06
[52] U.S. Cl. ............................. 241/5; 241/19; 241/24.12
[58] Field of Search ............................. 241/5, 18, 24.12, 241/19, 24.1, 14

[56] References Cited

U.S. PATENT DOCUMENTS

| | | | |
|---|---|---|---|
| 4,565,670 | 1/1986 | Miyazaki et al. ................... | 422/186.04 |
| 5,219,829 | 6/1993 | Bauer et al. ............................ | 505/510 |
| 5,336,271 | 8/1994 | Ishizaka et al. ...................... | 23/293 R |
| 5,841,200 | 11/1998 | Bauer et al. ............................ | 264/0.5 |

*Primary Examiner*—John M. Husar
*Attorney, Agent, or Firm*—Wenderoth, Lind & Ponack, LLP.

[57] ABSTRACT

A method for homogeneously mixing a uranium/plutonium mixed oxide which is used for the preparation of a uranium/plutonium mixed oxide fuel. The method comprises weighing a uranium oxide powder, a plutonium oxide powder, and a dry recovered powder prepared by grinding a uranium/plutonium mixed oxide sinter so as to give a predetermined plutonium enrichment; roughly mixing these powders together by means of a mixer; pulverizing and homogeneously mixing the roughly mixed powder by means of a jet mill; discharging the homogeneously mixed powder together with compressed air from the jet mill; and separating the mixed powder from the air by means of a first-stage cyclone to recover at least 90% of the discharged powder.

1 Claim, 3 Drawing Sheets

METHOD FOR HOMOGENEOUSLY MIXING URANIUM/PLUTONIUM MIXED OXIDE

BACKGROUND OF THE INVENTION

The present invention relates to a method for homogeneously mixing a uranium/plutonium mixed oxide powder, and more particularly to a method wherein a plurality of powders having different densities (specific gravities), such as a uranium oxide powder, a plutonium oxide powder, and a dry recovered powder, are homogeneously mixed together by means of a jet mill and are withdrawn in a homogeneously mixed state. This technique is useful for the preparation of uranium/plutonium mixed oxide pellets.

The preparation of a uranium/plutonium mixed oxide (MOX) fuel involves the steps of weighing predetermined amounts of a uranium oxide ($UO_2$) powder, a plutonium oxide ($PuO_2$) powder, a dry recovered powder prepared by grinding a uranium/plutonium mixed oxide sinter (a powder prepared by grinding sintered uranium/plutonium mixed oxide pellets having, for example, defective appearances, i.e., scrap pellets), and the like so as to give a predetermined plutonium enrichment (percentage addition) and homogeneously mixing the powders. A ball mill or an attritor mill has hitherto been used in the step of homogeneously mixing the uranium/plutonium mixed oxide powder.

In the ball mill, the feed and recovery of the powders are carried out in such a manner that the powders in a vessel are poured as such into the mill and, after the mixing, the homogeneous powder mixture in the mill is recovered in the vessel by tilting the mill. This method is advantageous in that the powders can be satisfactorily homogeneously mixed together and that the operating conditions (number of revolutions and time) can be readily set, therefore it has been extensively used in the art. The method, however, suffers from low mixing efficiency and the necessity for mixing for a long period of time. Further, the size of the apparatus has been increased for the throughput. In particular, in the preparation of a plutonium-containing nuclear fuel material, the apparatus should be installed within a glove box. Therefore, the apparatus is restricted by the size of the glove box and the consideration of maintenance, therefore a large-sized ball mill cannot be installed. An additional problem involved in the ball mill is that the treatment should be carried out batch-wise.

On the contrary, in the case of the attritor mill, the feed and recovery of the powders are carried out in such a manner that the powders are fed into the mill while vibrating the powders by means of a vibration feeder and that the resultant homogeneous powder mixture is discharged from the mill through piping. In this case, the treatment can be carried out continuously, is suitable for treatment of large amounts of powders, and can be carried out with high mixing efficiency. As with the ball mill, however, the attritor mill has a rotating section driven by a motor and hence is poor in maintenability. Further, since heat of friction is generated during mixing, a cooling mechanism should be provided in order to prevent oxidation of the uranium/plutonium mixed oxide powder. This poses an additional problem that the size of the apparatus should be further increased. Furthermore, due to the construction of the mill, the powders are likely to stay within the mill, leading to an increased exposure dose.

As is well known in the art, jet milling is a method for pulverizing a powder. A jet mill is an apparatus wherein particles are accelerated with the aid of a high-speed gas stream to allow the particles to collide with one another to conduct pulverization. The jet mill is advantageous in that continuous treatment and mass treatment are possible, that the generated heat of friction can be immediately removed, that the size of the device can be reduced, and that the maintenability is good. For these reasons, the jet mill has been used, for example, for pulverizing uranium/plutonium mixed oxide pellets having defective appearances (scrap pellets) to prepare a dry recovered powder. The jet mill, however, has not been used for homogeneously mixing a uranium/plutonium mixed oxide powder.

The jet mill is equipment which has been originally intended to be used for the pulverization of a ceramic powder but has not been extensively used for mixing purposes. This is because, although the jet mill has the function of mixing the powder, a possible range of mixing is limited. The reason for this is as follows. In the jet mill, the powders are fed and discharged in a manner utterly different from that in the case of the abovedescribed ball mill and the like. Specifically, the powders are fed into the jet mill with the aid of compressed air and, after the pulverization, the mixture of the pulverized powder with the air stream is discharged from the jet mill and then separated into the powder (solid) and the gas by means of a cyclone, a bag filter or the like, followed by the recovery of the separated powder only in a vessel.

In the above-described method for feeding and discharging powders using the jet mill, when powders having different compositions with different densities are mixed, unfavorably the dissimilar powders thus mixed are separated again from one another due to their difference in density in the course of the separation of the solid from the gas after the discharge. This leads to a variation in the composition of the resultant powder mixture. Therefore, the contemplated homogeneous mixing cannot be achieved. For this reason, the jet mill has been used in most cases in pulverization of ceramic powders having one and the same composition (for example, a powder prepared by crushing a sinter forming a solid solution on an atomic level) and the like, but has not been used in applications where dissimilar powders having different densities are homogeneously mixed together (mixing while pulverizing).

As described above, in the preparation of a uranium/plutonium mixed oxide fuel, a uranium oxide powder, a plutonium oxide powder, a dry recovered powder and the like should be homogeneously mixed together while pulverizing. If the homogenization-mixing is unsatisfactory, a portion rich in the plutonium component, called a "plutonium spot", is created within the sintered pellet. The presence of such a plutonium spot causes this portion to intensively undergo fission during exposure of the pellet, creating a high-temperature hot spots The plutonium spot present within the pellet has no significant influence. On the other hand, when the plutonium spot is present around the surface of the pellet, that portion becomes hot, greatly affecting a metallic cladding tube. In particular, the rise of the spot temperature sometimes causes the cladding tube to be melted, leading to a serious trouble, that is, fuel failure. For this reason, the size of the plutonium spot and the plutonium concentration of the pellet are strictly restricted, so that preferably the plutonium concentration should be as uniform as possible and the diameter of the plutonium spot should be as small as possible.

Various powders used in the preparation of a uranium/plutonium mixed oxide fuel are significantly different from one another in powder density. Specifically, the density of the plutonium oxide powder, the lowest-density powder, is about 2 g/cc, whereas the density of the dry recovered powder, the highest-density powder, is about 6 g/cc, that is, three times larger than that of the lowest-density powder. For this reason, when the jet mill is used, although the homogenization-mixing per se in the jet mill can be successfully carried out without posing any problem, the powders are again separated from one another due to their density difference in the course of the separation of the powder mixture from the gas after the discharge from the mill. Therefore, a plutonium-rich portion and a plutonium-lean portion are created in the powder, so that the contemplated satisfactory homogenization cannot be achieved.

SUMMARY OF THE INVENTION

An object of the present invention is to provide a method for homogeneously mixing a uranium/plutonium mixed oxide which, in the preparation of a uranium/plutonium mixed oxide fuel, enables a plurality of powders having different densities to be homogeneously mixed together while efficiently pulverizing the powders without a fear of the powders being oxidized and can construct a system having a small size and good maintenability.

According to the present invention, there is provided a method for homogeneously mixing a uranium/plutonium mixed oxide comprising: weighing a uranium oxide powder, a plutonium oxide powder, and a dry recovered powder prepared by grinding a uranium/plutonium mixed oxide sinter so as to give a predetermined plutonium enrichment; roughly mixing these powders together by means of a mixer; pulverizing and homogeneously mixing the roughly mixed powder by means of a jet mill; discharging the homogeneously mixed powder together with compressed air from the jet mill; and separating the mixed powder from the air by means of a first-stage cyclone to recover at least 90% of the discharged powder.

The reason why at least 90% of the discharged powder is recovered at once by means of a first-stage cyclone is that, even when there is about three times as great a difference in density, the powders are less likely to be re-separated from one another in the course of recovery. The recovery of at least 90% can be easily realized by regulating the amount of the compressed air fed into the jet mill (by increasing the amount of the air to increase the speed of the air stream). Alternatively, this can be attained also by varying the configuration of the firststage cyclone, for example, by reducing the inner diameter of the cyclone or by increasing the length of the cyclone.

PREFERRED EMBODIMENTS OF THE INVENTION

Figure 1:
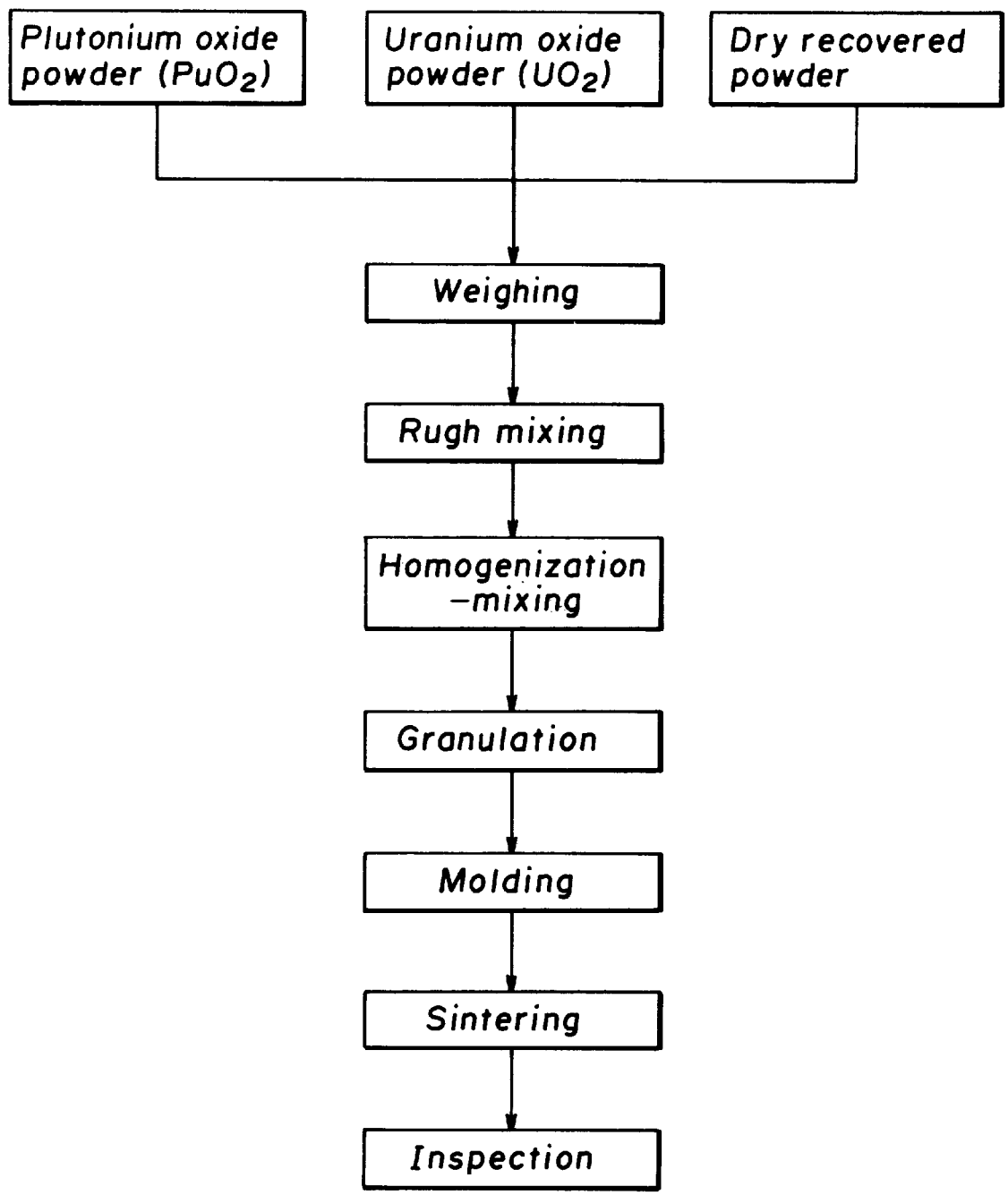
FIG. 1 is a process diagram for the preparation of uranium/plutonium mixed oxide fuel pellets.

The preparation of uranium/plutonium mixed oxide fuel pellets is carried out according to a preparation process as shown in FIG. 1. At the outset, a uranium oxide powder, a plutonium oxide powder, and a dry recovered powder (a powder prepared by grinding scrap pellets) are weighed so as to give a predetermined plutonium enrichment. Next, these powders are roughly mixed together by means of a mixer (though this step is unnecessary in the conventional method wherein a ball mill is used in the homogenization-mixing). In the stage of rough mixing, the powders having respective compositions are merely mixed together without any change in the size of the particles. If pellets are prepared from this roughly mixed powder, the plutonium oxide particle portion, even by sintering, does not satisfactorily yield a solid solution with uranium oxide, causing the plutonium oxide component to be left as a dense portion (a plutonium spot). In order to minimize the plutonium spot and to uniform the plutonium concentration, it is necessary to finely grind the particles of each powder and to homogeneously mix the fine powders. This step is called "homogenization-mixing." The powder is granulated after the homogenization-mixing for facilitating the molding, and the resultant granules are then molded into a desired shape and sintered to dissolve plutonium and uranium in each other to form a solid solution. After inspection, the product serves as a uranium/plutonium mixed oxide fuel pellet.

Figure 2:
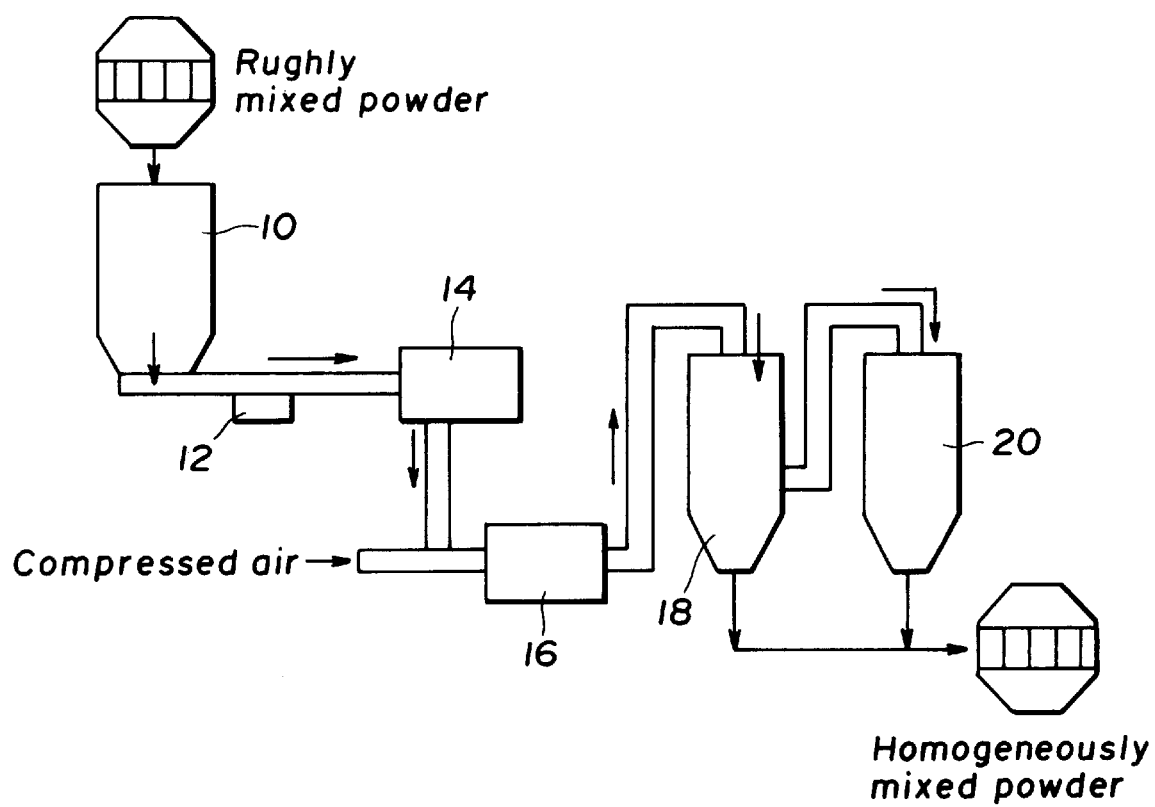
FIG. 2 is a diagram illustrating a homogenization-mixing process using a jet mill.

The step of homogenization-mixing by means of a jet mill according to the present invention is carried out by using a system as shown in FIG. 2. The roughly mixed powder is transferred to a storage tank 10 and then fed by means of a feeder 12 into a constant rate feeder 14. The roughly mixed powder is then transferred from the feeder 14 at a constant feed rate, accelerated by compressed air, and fed into a jet mill 16, where pulverization and mixing (homogenization-mixing) are carried out. The homogenized and mixed powder, together with the compressed air stream, is discharged from the jet mill 16, and the powder is separated from the air through a cyclone 18 and a cyclone 20 with a built-in bag filter. The powder is collected in a storage tank provided at the lower parts of both the cyclone 18 and the cyclone 20 with a built-in bag filter and recovered as a homogeneously mixed powder. This homogeneously mixed powder is then transferred to the following step of granulation.

Figure 3:
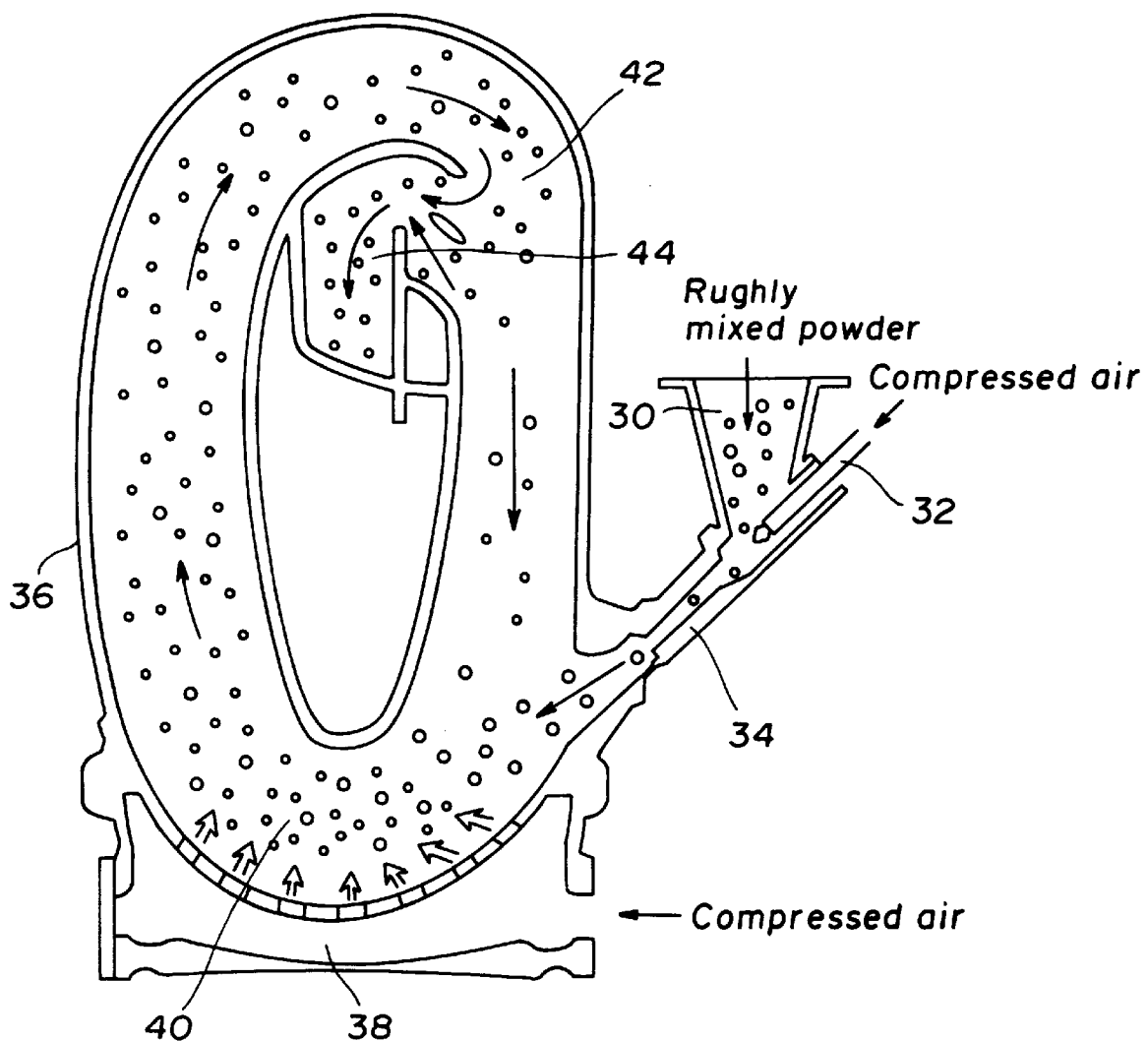
FIG. 3 is a diagram showing the structure of one embodiment of the jet mill.

In the jet mill, particles accelerated to approach the sound velocity by means of compressed air of 6 to 7 atm are allowed to collide with one another within the mill to pulverize the powder particles by utilizing the impact of the collision. In this case, mixing of dissimilar powders is simultaneously carried out. FIG. 3 shows an embodiment of the jet mill. The jet mills have various types and sizes and the one shown in FIG. 3 is of a vertical type. Besides this, there is a horizontal type jet mill like a particle accelerator. The roughly mixed powder is fed through a powder inlet 30, while the compressed air is fed through a compressed air inlet 32. The powder is accelerated by the compressed air, further accelerated by a Venturi nozzle 34, and fed into a mill body 36. Compressed air passed through a grinding nozzle 38 is blown into the mill body through the wall of the mill to permit the powder particles to collide with one another at violent speed near the sound velocity in a mixing-pulverization zone 40. Thus, the particles are pulverized and at the same time are mixed together. The resultant pulverized powder is separated in a classification zone 42 by a centrifugal force into coarse particles and fine powder. The fine powder is discharged through an output 44 outside the mill, while the coarse particles are returned to the mixing-pulverization zone 40. Thus, pulverization and mixing are carried out.

In the homogenization-mixing system shown in FIG. 2, the powders constituting the roughly mixed powder to be fed into the jet mill 16 are significantly different from one another in powder density. Specifically, the density of the plutonium oxide powder, the lowest-density powder, is about 2 g/cc, whereas the maximum density of the dry recovered powder, the highest-density powder, is about 6 g/cc, that is, three times larger than that of the lowest-density powder. For this reason, despite the homogenization-mixing within the body of the jet mill 16, there is a possibility that the powders constituting the homogeneously mixed powder are again separated from one another due to their density difference in the course of the separation of the powder from the gas after being discharged from the jet mill. In the cyclone 18, a powder having a relatively high density and a powder having a relatively large particle diameter are separated and collected in the lower part of the cyclone 18, while, in the cyclone 20 with a built-in bag filter, a powder having a relatively low density and a powder having a relatively small particle diameter are separated and collected by the lower part of the cyclone 20. When the powder collected by the cyclone 18 and the powder collected by the cyclone 20 are recovered in the same vessel, the mixed powder has a plutonium-rich portion and a plutonium-lean portion, so that no desired results can be obtained.

In order to evade this situation in the present invention, the recovery of the powder in the first-stage cyclone 18 is regulated to be at least 90%. The regulation of the recovery can be easily realized by regulating the amount of the compressed air fed into the jet mill (by increasing the amount of the air to increase the speed of the air stream). The practical numerical value of the amount of the compressed air fed into the jet mill necessary for this end can be experimentally determined although it varies depending upon the size and structure of the equipment used. Besides this, varying the configuration of the first-stage cyclone, for example, reducing the inner diameter of the cyclone or increasing the length of the cyclone, also enables the recovery of at least 90% of the discharged powder in the first-stage cyclone. The reason why at least 90% of the discharged powder should be recovered in the first-stage cyclone is that this value has been experimentally found to be effective in preventing the re-separation of the powders constituting the uranium/plutonium mixed oxide powder and having three times as great a difference in density.

The α autoradiograph of a pellet prepared by the homogenization-mixing in a jet mill according to the present invention was compared with that of a pellet prepared by the homogenization-mixing in a ball mill according to the prior art method. The "α auto-radiograph" is a photograph prepared by pressing the pellet against cellulose and then conducting exposure and development. Since a portion that is richer in α-rays (that is, a portion that is richer in plutonium) destroys the cellulose structure more severely and looks black in the photograph, the diameter and amount of the plutonium spot can be observed. According to this method, in the case of the pellet prepared by using a roughly mixed powder, a large number of large black spots (plutonium spots) are observed, and the size of each spot is up to about 0.3 mm. This state does not satisfy the requirements for the plutonium spot. By contrast, according to the method of the present invention, the plutonium spot is hardly observed and, if any, has a size on the order of about several μm, confirming that the method of the present invention using a jet mill can realize homogenization-mixing to an extent comparable to that attained by the ball mill.

The method of the present invention is applied to the homogenization-mixing of a uranium/plutonium mixed oxide powder. In addition, the method can be applied also to homogenization-mixing of a uranium/gadolinia ($Gd_2O_3$) mixed oxide powder or a uranium/plutonium/gadolinia mixed oxide powder.

As being understood from the foregoing, according to the method for homogeneously mixing a uranium/plutonium mixed oxide by means of a jet mill, the treatment is carried out continuously, thus enabling treatment of the powders in a large amount, and hardly creates an adverse effect of the heat of friction during mixing (although this heat of friction is generated to some extent, the generated heat is immediately removed because mixing is carried out in a large amount of an air stream), so that the powder is hardly oxidized. Further, regarding the system, the size of the apparatus can be reduced and the maintenance can be easily carried out, so that the apparatus can be easily housed in a glove box. Further, since there is no rotating section driven by a motor or the like, no deposition of powders on the rotating section occurs and the frequency of failures created by friction is small. Furthermore, the powders hardly stay within the mill and the exposure dose is not increased, while there is no need to provide a cooler. Furthermore, the homogeneity of the resultant mixed powder is comparable to that of the mixed powder prepared by homogenization-mixing using a ball mill.

What is claimed is:

1. A method for homogeneously mixing a uranium/plutonium mixed oxide comprising:

weighing a uranium oxide powder, a plutonium oxide powder, and a dry recovered powder prepared by grinding a uranium/plutonium mixed oxide sinter so as to give a predetermined plutonium enrichment;

roughly mixing these powders together by means of a mixer;

pulverizing and homogeneously mixing the roughly mixed powder by means of a jet mill;

discharging the homogeneously mixed powder together with compressed air from the jet mill; and separating the mixed powder from the air by means of a first-stage cyclone to recover at least 90% of the discharged powder.

* * * * *